United States Patent [19]

Searfoss et al.

[11] 4,218,361

[45] Aug. 19, 1980

[54] FRICTION MATERIAL

[75] Inventors: William H. Searfoss; Gerald P. Jones, both of Ridgway, Pa.

[73] Assignee: Molded Materials Company, Div. Carlisle Corporation, Ridgway, Pa.

[21] Appl. No.: 20,431

[22] Filed: Mar. 14, 1979

[51] Int. Cl.$^2$ .................... C08K 3/08; C08K 3/22; C08K 3/34

[52] U.S. Cl. .................................................. 260/38

[58] Field of Search .................... 260/38, DIG. 39

[56] References Cited

U.S. PATENT DOCUMENTS

| | | | |
|---|---|---|---|
| 2,553,698 | 5/1951 | Brahs | 260/DIG. 39 |
| 2,686,140 | 8/1954 | de Gaugue | 260/DIG. 39 |
| 3,092,595 | 6/1963 | Smith et al. | 260/DIG. 39 |
| 3,227,249 | 1/1966 | Kuzmick et al. | 188/251 |
| 3,344,094 | 9/1967 | de Gaugue | 260/DIG. 39 |
| 3,725,334 | 4/1973 | Popp et al. | 260/DIG. 39 |
| 3,832,325 | 8/1974 | Eschen | 260/DIG. 39 |
| 3,959,194 | 5/1976 | Adelmann | 260/17.2 |
| 3,966,670 | 6/1976 | Grazen et al. | 260/DIG. 39 |
| 4,150,011 | 4/1979 | Searfoss et al. | 260/38 |

*Primary Examiner*—Sandra M. Person
*Attorney, Agent, or Firm*—Webster B. Harpman

[57] ABSTRACT

A heat resistant low abrasion high strength friction material with a high resistance to wear is described as containing asbestos fibers, phenolic resin, spun blast furnace slag fibers, rubber particles, a filler and ferrous or non-ferrous particles. The friction material finds particular use in the formation of brake blocks, drum brake lining and disc pads for vehicle braking systems and the like.

10 Claims, No Drawings

FRICTION MATERIAL

BACKGROUND OF THE INVENTION

1. Field of the Invention

This invention relates to friction material such as used in brake blocks, brake linings and pads in vehicle braking systems.

2. Description of the Prior Art

The prior art friction materials have typically included asbestos fibers, phenolic resins, cashew nut shell oil particles, rubber particles, fillers, and ferrous or non ferrous metallic particles. The cashew oil based friction particles were usually cashew nut shell oil reacted with an aldehyde to form a thermoset material, the oil after heat treating for bodying and to remove the toxicity has also been used as a liquid binder in brake linings and disc brake pads. The thermoset material in particle form has been used extensively in most friction material compounds and usually in a weight percentage range of from 1% to 15%.

The present invention utilizes a processed mineral fiber formed of blast furnace slag such as known in the art as spun slag. The spun slag fibers replace the cashew oil based friction particles in substantially the same weight percentage range as the cashew nut shell oil in fusible thermoset particles heretofore referred to and result in a friction material yielding friction levels and wear characteristics equivalent to or better than prior art materials. The formation of the improved friction material is less costly and time consuming with the spun slag fibers than the comparable material utilizing the cashew oil based particles of the prior art and the relatively inexpensively formed spun slag fibers are available on the domestic market and free the friction material industry from reliance on unstable volume availability and price instability which has characterized the cashew nut shell oil of the prior art.

Typical prior art patents include the following: U.S. Pat. No. 3,227,249 of Jan. 4, 1966 discloses a molded composition brake shoe, a typical friction material, in which cashew nut shell liquid resin known as cashew polymer was present.

U.S. Pat. No. 3,959,149 discloses a brake shoe material in which cashew nut oil particles were present.

Both of these prior art patents disclose compositions dependent on the presence of the cashew nut shell oil resin and/or cashew nut shell oil particles. The present invention has no cashew nut shell oil based resins or particles and utilizes fibers spun from blast furnace slag which improve the wear characteristics and the frictional performance of the friction materials incorporating the same.

SUMMARY OF THE INVENTION

An efficient wear and heat resistant friction material capable of economic manufacture can be made from a composition comprising 20% to 60% by weight of asbestos fibers, 13% to 33% by weight phenolic resin and associated modifier such as a GRS polymer, 1% to 15% by weight spun blast furnace slag fiber, 3% to 9% by weight rubber particles, natural or synthetic, 15% to 35% fillers, such as barytes (barium sulphate) and 2% to 10% ferrous or non-ferrous particles such as metallic oxides.

DESCRIPTION OF THE PREFERRED EMBODIMENT

The composition of the friction material of this invention is satisfactory for the manufacture of brake blocks, drum brake linings and disc pads for vehicle braking systems and the like such as used for example in heavy-duty trucks. The composition of the material of this invention incorporates asbestos fibers which in a typical example of the invention will be present in an amount approximately 40% by weight, phenolic resin and a modifier 20% by weight, spun blast furnace slag fibers 10% by weight, rubber particles, natural or synthetic, 5% by weight, a filler such as barytes (barium sulphate) 15% by weight and ferrous or non-ferrous particles such as metallic oxides 10% by weight.

The asbestos fibers and the spun blast furnace slag fibers combine readily in the mixing and manufacturing process with the other named materials. A batch of the material is thoroughly mixed and preformed under pressure to a desired shape with the formed shapes being positioned in a hydraulic molding press and subjected to 2000 PSI pressure at a temperature of between 285° F. to 350° F. for a suitable time such as ten minutes. The cured shapes are removed to an oven for a post cure at a temperature of between 300° F. to 350° F. for a time of approximately 18 hours.

Those skilled in the art will observe that the quantities of the ingredients in the composition of the material may vary considerably. For example the asbestos fibers may be present in quantities between 20% and 60%, a total of the phenolic resin and its modifiers may be present in amounts between 15% and 33%, the spun blast furnace slag fibers may be present in amounts between 1% and 15%, the rubber particles, natural or synthetic, may be present in amounts between 3% and 9%. The fillers may be present in amounts between 10% and 35% and the ferrous or non-ferrous particles may be present in amounts between 2% and 12%. The rubber particles act as friction ingredients and may be natural or synthetic or an elastomeric material which can be vulcanized or otherwise cured. When synthetic, the rubber can be butyl, styrene-butadiene, or nitrile.

Further example of the composition of this invention may be seen in the following: asbestos fiber 60% by weight, phenolic resin 22% by weight, spun blast furnace slag fiber 4% by weight, rubber particles 4% by weight, fillers 10% by weight.

Those skilled in the art will recognize that the economic problems heretofore associated with the use of cashew nut shell oil either as a liquid binder or as an infusible thermoset particle were overcome completely through the use of the composition of this invention wherein spun blast furnace slag fibers are present and contribute significantly to the frictional stability and good fade and recovery characteristics, which are highly desirable in a friction material. Of equal importance is the improved heat resistance and wear resistance of the friction material in its end use, the brake block, drum brake lining or disc brake pads in a vehicular braking system.

Within the scope of this invention limited amounts of cashew nut oil based friction particles and/or cashew nut shell oil as a binder can be added to the materials hereinbefore set forth, for example 1% to 10% of the cashew nut shell oil based particles and/or 1% to 10% of the cashew nut shell oil can be used in the material if desired.

A specific batch example can comprise: asbestos fiber 40% by weight, phenolic resin 20% by weight, spun blast furnace slag fibers 6% by weight, cashew nut shell oil based particles 4% by weight, rubber particles 5% by weight, fillers 15% by weight, and metallic particles, such as ferrous and non ferrous metallic oxides 10% by weight.

A further specific example may comprise asbestos fibers 40% by weight, resin 20%, spun blast furnace slag fiber 6%, cashew nut shell oil 4%, rubber particles 5%, fillers 15% and metallic particles 10%.

Although several embodiments of the present invention have been illustrated and described, it will be apparent to those skilled in the art that various changes and modifications may be made therein without departing from the spirit of the invention and having thus described our invention what we claim is:

1. An improved heat and wear resistant friction material comprising in approximate percent by weight; asbestos fibers 20%–60%, phenolic resin 15%–33%, spun blast furnace slag fibers 1%–15%, rubber particles 3%–9%, fillers 10%–35%, metallic oxide 2%–12%.

2. The improved heat and wear resistant friction material of claim 1 and wherein a modifier is included with the phenolic resin.

3. The improved heat and wear resistant friction material of claim 2 and wherein said modifier is organic.

4. The improved heat and wear resistant friction material of claim 2 and wherein said modifier is GRS polymer.

5. The improved heat and wear resistant friction material of claim 1 and wherein said metallic oxide is ferrous and non-ferrous particles.

6. An improved heat and wear resistant friction material comprising in approximate percent by weight; asbestos fibers 40%, phenolic resin 20%, spun blast furnace slag fibers 10%, rubber particles 5%, fillers 15%, metallic oxide 10%.

7. An improved heat and wear resistant friction material comprising in approximate percent by weight; asbestos fibers 60%, phenolic resin 22%, spun blast furnace slag fibers 4%, rubber particles 4%, fillers 10%.

8. An improved heat and wear resistant friction material comprising in approximate percent by weight; asbestos fibers 30%, phenolic resin 15%, spun blast furnace slag fibers 15%, rubber particles 8%, fillers 20%, metallic particles 12%.

9. The improved heat and wear resistant friction material of claim 1 and wherein cashew nut shell oil particles in amounts by weight 1%–10% are present.

10. The improved heat and wear resistant friction material of claim 1 and wherein cashew nut shell oil in amounts by weight 1%–10% are present.

* * * * *